United States Patent [19]
Bergmann

[11] Patent Number: 5,729,377
[45] Date of Patent: Mar. 17, 1998

[54] OPTICAL APPARATUS

[75] Inventor: Ernest Eisenhardt Bergmann, Fountain Hill, Pa.

[73] Assignee: Lucent Technologies, Inc., Murray Hill, N.J.

[21] Appl. No.: 578,721

[22] Filed: Dec. 26, 1995

[51] Int. Cl.[6] ............................................. G02B 5/30
[52] U.S. Cl. ............................................. 359/249; 359/495
[58] Field of Search ............................ 359/249, 282, 359/283, 495, 497

[56] References Cited

U.S. PATENT DOCUMENTS

| | | | |
|---|---|---|---|
| 4,178,073 | 12/1979 | Uchida et al. | 350/151 |
| 4,492,436 | 1/1985 | Bergmann | 350/395 |
| 5,251,057 | 10/1993 | Guerin et al. | 359/249 |
| 5,262,892 | 11/1993 | Nakamura | 359/484 |
| 5,267,078 | 11/1993 | Shiraishi et al. | 359/494 |
| 5,381,261 | 1/1995 | Hirai et al. | 359/282 |
| 5,414,541 | 5/1995 | Patel et al. | 359/39 |
| 5,436,755 | 7/1995 | Guerin | 359/249 |
| 5,446,578 | 8/1995 | Chang et al. | 359/282 |

FOREIGN PATENT DOCUMENTS 0 574 749 A  12/1993  European Pat. Off. ....... G02F 1/09

*Primary Examiner*—David C. Nelms
*Assistant Examiner*—Thomas Robbins

[57] ABSTRACT

A walk-off device is used to split an incoming beam into two parallel outgoing beams having orthogonal polarization. A polarization flipper is positioned to change the polarization of one of the two beams exiting from the walk-off device so that the two beams are parallel and have essentially identical polarizations. A nonreciprocal device receives the two beams, and the resulting apparatus is a polarization independent nonreciprocal device. Conversely, a polarization flipper flips the polarization of one of the two parallel beams of like polarizations into orthogonal polarizations and subsequently a walk-off device combines or superimposes these two beams to form an unpolarized single beam.

14 Claims, 1 Drawing Sheet

OPTICAL APPARATUS

TECHNICAL FIELD

This invention relates generally to the field of optical devices and particularly to the field of optical devices, such as circulators and isolators, that are useful in optical communications systems.

BACKGROUND OF THE INVENTION

Optical communications systems, as well as other optical technologies, require apparatus that manipulates optical signals that are in the form of light rays. The best known apparatus for such manipulation at the present time is probably the ubiquitously used silica based optical fiber which is used for both short and long distance optical transmission. Additionally, other well known apparatus includes the couplers and multiplexers that have been developed to couple one or more optical signals into one or more optical fibers or waveguides. Some applications desirably use nonreciprocal apparatus or devices and such devices have been developed; of course, not all optical devices are nonreciprocal. Nonreciprocal means that the propagation characteristics of light within the apparatus depends upon the direction of light propagation within the apparatus.

One type of such nonreciprocal apparatus, commonly referred to an optical isolator, permits light to pass through the apparatus in one direction but not in the reverse direction. Another type of such nonreciprocal apparatus is termed an optical circulator; this device has 3 or more ports which permit light to pass from a first to a second port but not from the second port to the first port; instead light entering the second port passes to a third port. An isolator may be thought of as a two port circulator; however, the term isolator is the preferred term.

Many types of optical devices, including the circulators and isolators briefly described in the previous paragraph, have been developed for commercial applications. For many applications, the device should be polarization independent to the external world. That is, the device operation should not depend upon the polarization of the incoming light. For example, Fujii in Journal of Lightwave Technology, 10, pp. 1226–1229, September 1992, describes a polarization independent apparatus that he states can be used as an optical circulator. The apparatus is schematically depicted in his FIG. 1. Although stated to be useful over a wide range of wavelengths, preferred operation of the apparatus depends upon precise orientation of the components with respect to each other. Another optical circulator is described by Koga in U.S. Pat. No. 5,204,771 issued Apr. 20, 1993. The essence of Koga's circulator appears to be the use of a birefringent plate followed by nonreciprocal optical rotators. The birefringent plate splits the incoming beam into two parallel beams and the optical rotators change the polarizations of each of the two beams by 45 degrees so that there are two parallel beams with orthogonal polarizations.

Consideration of the devices described in the previous paragraph reveals aspects that make their use disadvantageous in some situations. As mentioned, the Fujii circulator depends upon precise relative orientation of the components; this orientation may be difficult to achieve in practice and still more difficult to maintain for extended periods of time. The Koga device is extremely complicated. The complexity arises not only because there are many components, but also because the large number of components necessarily has a large number of surfaces. Any one of these surfaces can produce undesired reflections. The devices must be designed to either eliminate the reflections or to compensate for them. Additionally, the optical rotators must be precisely aligned so that one beam passes through the top half of the rotator and the other beam passes through the bottom half of the rotator. The small beam sizes and small separation of the beams will likely make this difficult.

SUMMARY OF THE INVENTION

According to a preferred embodiment of the invention, an optical device has at least a first walk-off device that either separates an incoming beam into two outgoing mutually parallel beams of orthogonal polarization or combines two mutually parallel incoming beams of orthogonal polarization into a single outgoing beam, and at least a first polarization flipper positioned to change the polarization of one of the two outgoing beams to match the polarization of the other outgoing beam from the first walk-off device or to change the polarization of one of the incoming beams. A nonreciprocal section is positioned to receive the two beams. The polarization may be linear or elliptical including circular as a particular case. The device may also have a second walk-off device and a second polarization flipper that combine the two beams from the combination of first walk-off device and first polarization flipper. The combination of the first walk-off device and the first polarization flipper, as well as the combination of the second walk-off device and the second polarization flipper, may or may not contain nonreciprocal elements. Additional elements, possibly including nonreciprocal elements, may be included.

For reasons of clarity, the elements depicted are not drawn to scale.

DETAILED DESCRIPTION

Figure 1:
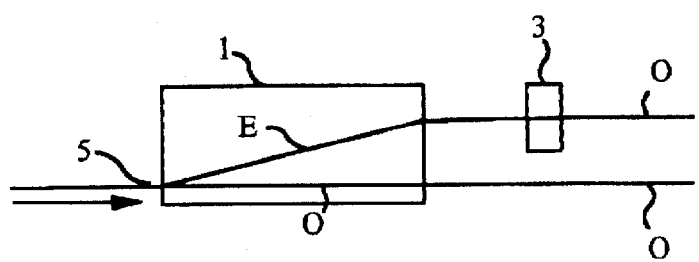
FIGS. 1 and 2 are sectional views of optical devices according to this invention.

The invention will be described by reference to the exemplary embodiment depicted in FIG. 1. Shown in FIG. 1 are walk-off device 1 and polarization flipper 3. The direction of propagation of the incoming beam is designated by the arrow; the walk-off device splits the incoming beam into ordinary and extraordinary beams which are designated as O and E, respectively. The incoming beam enters the device at port 5 which is adapted to receive the incoming light and functions as an input. The E beam passes through the polarization flipper 3. The E component is changed into O and there are two parallel O beams. The two O beams exiting from the device are parallel and have parallel polarizations after polarization flipping. The walk-off device may be fabricated from a birefringent material such as calcite or rutile; such materials are well known and the walk-off device will be readily fabricated by those skilled in the art as will the polarization flipper.

Although the beam is shown as going from left to right with the device operating as a polarization splitter, the device may also be operated as a polarization combiner with the two O beams going from right to left and entering the device on the right side. The polarization flipper is now used so that the O component is changed into E when combining. When combining, the walk-off device 1 then walks the E and O beams(one O beam has been changed to E polarization by polarization flipper 3) together so that both beams combine and exit at port 5 which now functions as an output. The device depicted may be termed an OPSOC which is an acronym for "O Polarization Splitter Or Combiner."

Figure 2:
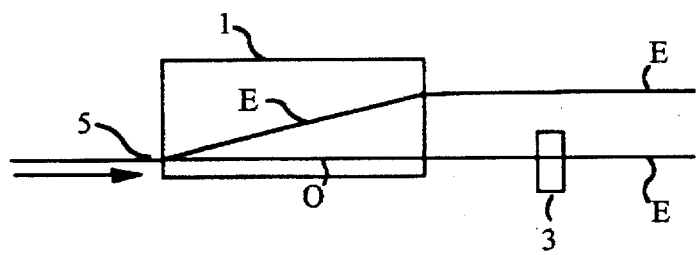

The polarization flipper may flip the polarization of the O ray exiting from the first walk-off device; such a device in depicted in FIG. 2. The device is similar to that depicted in FIG. 1 except that the two outgoing beams are E beams because the O beam passes through the first polarization flipper 3. Accordingly, the device is conveniently referred to as an EPSOC which is an acronym representing "E Polarization Splitter Or Combiner." The EPSOC device is generally similar to the OPSOC device; however, the polarization flipper is used to change the O polarization component into E when splitting and to change the E polarization component into O when combining.

Figure 3:
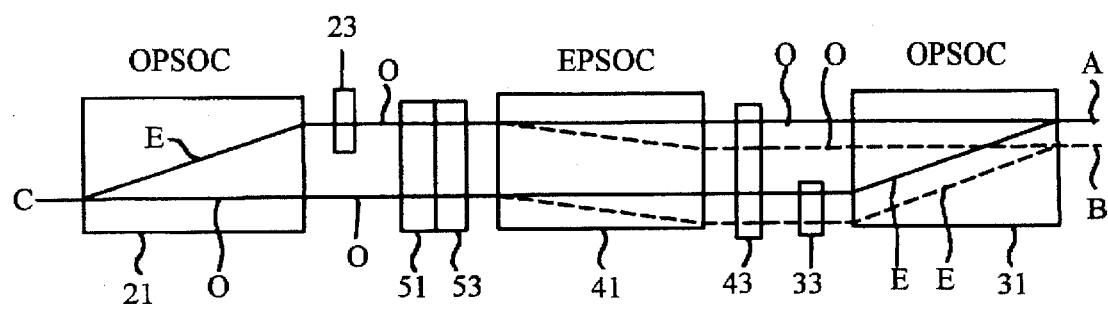
FIG. 3 is a sectional view of another optical device according to this invention that incorporates several of the devices depicted in FIGS. 1 and 2.

The devices depicted in FIGS. 1 and 2 may be used individually or they may be combined, possibly with other elements, in yet more complicated devices. In the more complicated devices, a nonreciprocal section is positioned to receive the two beams. Such a device is shown in FIG. 3 and incorporates first and second OPSOC devices as depicted in FIG. 1 as well as the EPSOC device depicted in FIG. 2. The EPSOC device is between the first and second OPSOC devices. The first and second OPSOC devices are formed by walk-off device 21 and polarization flipper 23 and by second walk-off device 31 and second polarization flipper 33, respectively. Between the first and second OPSOC devices are Faraday rotator 51 and half wave plate 53 as well as EPSOC device having a walk-off device 41 and a polarization flipper 43. An alternative embodiment uses two EPSOC devices and an OPSOC device between the two EPSOC devices. As shown here, the walk-off devices are oriented so that the walk-off direction is either into or in the plane of the paper. The device has three ports which are shown as A, B and C. Light is transmitted from port B to port C and from port C to port A. The device is a partial circulator(there is no light transmission from port A to port C), but in accordance with current terminology will be referred to as a circulator.

Before the operation of the circulator depicted in FIG. 3 is described, several comments about the operation of the Faraday rotator and half-wave plate are believed appropriate. The Faraday rotator is used in conjunction with a magnetic field that is either approximately parallel to the beam direction or approximately anti-parallel to the beam direction. For a given Faraday material and optical wavelength, the amount of rotation of the plane of polarization for a given thickness of material can be readily determined. Reversing the direction of the beam propagation without a corresponding reversal of the direction of the magnetic field will cause the rotation direction of the plane of polarization to be in the opposite sense. By choosing a thickness of the material so that the amount of rotation is about 45 degrees, useful, non-reciprocal behavior can be obtained with the use of a polarization rotator as the suitably oriented half-wave plate 53. If the plate 53 is oriented to also rotate the plane of polarization 45 degrees, then a beam passing in one direction through the combination of elements 51 and 53 will experience a polarization flip whereas the beam will experience no change in the reverse direction. This behavior can be achieved without requiring that elements 51 and 53 be in contact with each other and can be achieved even with element 51 following element 53. Of course, one could use optical activity instead of birefringence for element 53. In the following discussion, it is assumed for purposes of exposition that the beams passing from right to left through the pair of elements experience no change in polarization; and for beams passing from left to right, it is assumed for purposed of exposition that the polarization is flipped 90 degrees.

The operation of the circulator depicted in FIG. 3 is now readily understood. Light propagation from port C to port A will be described. The unpolarized incoming beam enters walk-off device 21 at port C and is separated into O and E polarized beams as shown. The E beam has its polarization flipped by polarization flipper 23 so that the polarizations of both beams are now parallel. The beams pass through the combination of elements 51 and 53 and, by the assumptions made above for purposes of exposition, the polarizations of both beams are flipped by 90 degrees. The two beams then enter the walk-off device 41 of the EPSOC device as O-polarized beams with respect to 41 and travel through walk-off device 41 as shown by the solid lines and enter polarization flipper 43. If the beams had possessed the other polarization when entering walk-off device 41, they would have walked-off as extraordinary beams out of the plane of the paper as shown by the dotted lines.

Continuing the paths of the two beams, indicated by the solid lines, the lower beam passes through the second polarization flipper 33 so that it is E-polarized with respect to the second walk-off device 31, and this device walks these two beams together so that both exit from port A.

The propagation of a light beam entering port B is now easily understood. Port B is out of the plane of the paper as indicated by the dotted lines going from right to left. The unpolarized beam is split into O and E polarization components by walk-off device 31 and polarization flipper 33 flips the polarization of the lower beam. Both beams, being out of the plane of the paper, pass around polarization flipper 43. The two beams are E polarized relative to walk-off plate 41 and so are walked back into the plane of the paper. The E polarized beams relative to 41 are then passing through the nonreciprocal combination of elements 51 and 53 where they are assumed to not have their polarizations flipped. They are O polarized with respect to walk-off plate 21. The upper beam has its polarization flipped to E by polarization flipper 23 and walk-off plate 21 then walks the two beams together so that they both exit at port C.

Propagation between other ports will be readily understood without further explanation. Specifically, light entering at port A will fail to exit at any port whatsoever.

Variations in the embodiment depicted will be readily thought of by those skilled in the art. For example, the term walk-off device is used to mean any device that yields parallel beams with orthogonal polarizations. The polarization flipper may be implemented by other means such as by Faraday rotation or by optical activity. The polarizations may or may not be parallel/perpendicular to the beam separation direction. Thus, the invention includes embodiments that are not characterized as either EPSOC or OPSOC. These embodiments may be referred to as LPSOC which is the acronym for "Like Polarization Splitter Or Combiner." Although FIG. 3 was described with respect to a "half wave plate," this term is used to mean a $(n+\frac{1}{2})$ wave plate where n is an odd integer. A preferred embodiment may require that the first OPSOC and second OPSOC be relatively inverted such as depicted in FIG. 3. This embodiment helps to equalize the optical path lengths and hence minimize polarization mode dispersion(PMD) as well as polarization dispersion loss(PDL). The same considerations are applicable to a first EPSOC and a second EPSOC. In other words, the first and third devices should be the same so that losses and path lengths are compensated or matched.

The invention claimed is:

1. Optical apparatus comprising:
   at least a first walk-off device, said first walk-off device capable of separating an incoming beam into two parallel outgoing beams of orthogonal polarization, or combining two incoming parallel beams of orthogonal polarization into one outgoing beam;
   at least a first polarization flipper positioned to change the polarization of one of the two beams from the first walk-off plate so that the polarizations of both beams exiting from the first polarization flipper are essentially the same, or to change the polarization of one of the two incoming beams so that the beam exiting from the first walk-off device is unpolarized; and,
   a nonreciprocal element positioned to receive said two polarized beams;
   in which said nonreciprocal element comprises a Faraday rotator; and
   said nonreciprocal element further comprises a half-wave plate positioned to receive said two beams.

2. An optical apparatus comprising:
   a first walk-off device having two inputs and four outputs;
   a second walk-off device having four inputs coupled to said four outputs of said first device and having two outputs;
   a first polarization flipper disposed between a first pair of said four inputs and four outputs; and
   a second polarization flipper disposed between a second pair of said four inputs and four outputs, so that said pairs have one of said four inputs and four outputs in common.

3. The device of claim 2 wherein said pairs have only one of said four inputs in common and four outputs in common and three not in common.

4. The apparatus of claim 2 wherein each of said walk-off devices is capable of separating an incoming light beam on one of its inputs into two parallel light beams of orthogonal polarization on two of its four outputs or combining two parallel light beams of orthogonal polarization on separate ones of its inputs into one light beam on one of its outputs, and each of said flippers is capable of changing the polarization of one of said two beams so that the polarization of both beams exiting said flippers are essentially the same or to change the polarization of one of said two incoming beams so that the beam exiting from said devices is unpolarized.

5. Optical apparatus as recited in claim 2 which couples outgoing polarized beams to a closely spaced fiber pair through the use of collimating means.

6. Optical apparatus as recited in claim 5 in which the collimating means is comprised of GRIN lenses.

7. Optical apparatus as recited in claim 2 in which said apparatus acts as an optical circulator.

8. Optical apparatus as recited in claim 2 in which said walk-off devices compose a birefringent material.

9. Optical apparatus as recited in claim 2 in which said polarization flippers are comprised of Faraday rotators.

10. Optical apparatus as recited in claim 2 in which said polarization flippers are comprised of an optically active material.

11. Optical apparatus comprising first, second, and third "like polarization splitter or combiner" devices, said second device being between said first and third devices, each device having a walk-off device as a component thereof in which said first and third devices are "O-polarization splitter or combiner" devices.

12. Optical apparatus comprising first, second, and third "like polarization splitter or combiner" devices, said second device being between said first and third devices, each device having a walk-off device as a component thereof in which said first and third devices are "E-polarization splitter or combiner" devices.

13. Optical apparatus comprising first, second, and third "like polarization splitter or combiner" devices, said second device being between said first and third devices, each device having a walk-off device as a component thereof, in which said first and third like polarization splitter or combiner devices are of the same type, and in which said second "like polarization splitter or combiner" device is of a type opposite to said type of said first and third devices.

14. A "bulk optic polarization splitter/combiner" device comprising:
   at least a first walk-off device, said first walk-off device capable of either separating two incoming light beams into four parallel outgoing beams of orthogonal polarization, each incoming beam being separated into one extraordinary beam and one ordinary beam, or combining four outgoing parallel beams of orthogonal polarization into two outgoing beams, originally split beams being rejoined;
   at least a first polarization flipper positioned to rotate, by 90°, the polarization of two of the four outgoing parallel light beams of said first walk-off device, the two beams so rotated being having either the same polar orientation or having opposite orientations;
   at least a second polarization flipper positioned perpendicular to the first polarization flipper to change the polarization of two of the four outgoing parallel light beams of said first walk-off device, such that of the four outgoing beams one beam has been rotated by 90° twice, two beams having been rotated by 90°, while one beam with a specific orientation has not been rotated by a polarization splitter at all, creating two pairs of outgoing beams wherein the beams originally split in the said first walk-off device now have the same polarization; and,
   at least a second walk-off device, said second walk-off device capable of either separating two incoming light beams into four parallel outgoing beams of orthogonal polarization, each incoming beam being separated into one extraordinary beam and one ordinary beam, or combining four outgoing parallel polarized beams into two outgoing polarized beams, each of the two outgoing beams that was the product of a single incoming beam originally split in the said first walk-off device having the same polarization and being rejoined, resulting in one outgoing beam of either ordinary or extraordinary polarization while the second outgoing beam is of the opposite orientation.

* * * * *